United States Patent [19]

Faxon

[11] 3,979,652
[45] Sept. 7, 1976

[54] ELECTROMAGNETIC MOTOR UTILIZING ATTRACTION AND REPULSION FORCES

[76] Inventor: Charles E. Faxon, 1269 E. 1st. South No. 3, Salt Lake City, Utah 84102

[22] Filed: Aug. 25, 1975

[21] Appl. No.: 607,357

[52] U.S. Cl. ............................... 318/254; 310/46; 310/112
[51] Int. Cl.² ........................................ H02K 37/00
[58] Field of Search ............... 310/46, 49, 112, 114, 310/126; 318/254, 138, 696

[56] References Cited
UNITED STATES PATENTS

| | | | |
|---|---|---|---|
| 3,478,237 | 11/1969 | Faxon | 310/114 X |
| 3,568,030 | 3/1971 | Faxon | 318/696 |
| 3,832,581 | 8/1974 | Hoffmann et al. | 310/46 |

*Primary Examiner*—Donovan F. Duggan
*Attorney, Agent, or Firm*—Trask & Britt

[57] ABSTRACT

An electromagnetic motor which incorporates a plurality of shafts each of which carries individual rotors and is journaled within stators is provided with six rotors per shaft, each of which carries switching mechanisms spaced 60° apart. The rotors and stators each incorporate electromagnets to provide drive torque, and the aligned rotor elements on each shaft are offset from those of the adjacent shafts to establish a continuity of drive torque. The shafts are mechanically coupled at one end through a gear box, and at their opposite ends by a continuous belt, chain or gear system.

5 Claims, 2 Drawing Figures

ELECTROMAGNETIC MOTOR UTILIZING ATTRACTION AND REPULSION FORCES

BACKGROUND OF THE INVENTION

1. Field

This invention pertains to electromagnetic motors and provides an improved such motor utilizing a plurality of shafts, each of which is associated with a plurality of stators and six rotors.

2. State of the Art

U.S. Pat. No. 3,568,030 which issued to the inventor of this patent application, discloses motors wherein a plurality of rotor-stator structures carried on a shaft and supporting circular arrays of electromagnets are synchronously switched to establish attracting and repelling forces, causing the unit to revolve to provide an output torque. That patent is specifically directed to an improved system which utilizes a plurality of mechanically intercoupled rotary shafts with the electromagnets on each shaft aligned rather than being angularly offset as in the single shaft embodiments. Such a structure was found to improve the magnetic circuit and afford double-ended operation for individual electromagnets while still accomplishing continuous drive torque by offsetting the magnetic elements of the different shafts. The disclosure of the aforesaid U.S. Pat. No. 3,568,030 is incorporated herein by reference, and specific note is taken of the references cited during the prosecution of that patent; namely: U.S. Pat. Nos. 2,523,503; 2,808,556; 2,830,247; 3,005,118; 3,146,386; 3,268,785; and 3,293,460, as pertinent prior art.

SUMMARY OF THE INVENTION

Several improvements to the motor disclosed in the aforesaid U.S. Pat. No. 3,568,030 and its predecessor patent application Ser. No. 661,449, are now recognized. For example, it has been found desirable to utilize electronic switching rather than mechanical switching for the purpose of reversing the polarity of the electromagnets during operation of the motor. It is further now considered to be advantageous when incorporating a plurality of shafts in such a motor to decouple the rotors from alternate shafts to avoid driving every other shaft in a direction opposing the direction of rotation of the adjacent shaft. When mechanical decoupling of a shaft from the rotors carried by that shaft is effected, it is advantageous to couple the shaft to adjacent driven shafts. In this fashion, all of the shafts in the motor are caused to rotate synchronously and in the same direction.

BRIEF DESCRIPTION OF THE DRAWING

In the drawing, which illustrates what is presently regarded as the best mode for carrying out the invention.

DESCRIPTION OF THE ILLUSTRATED EMBODIMENT

Figure 1:
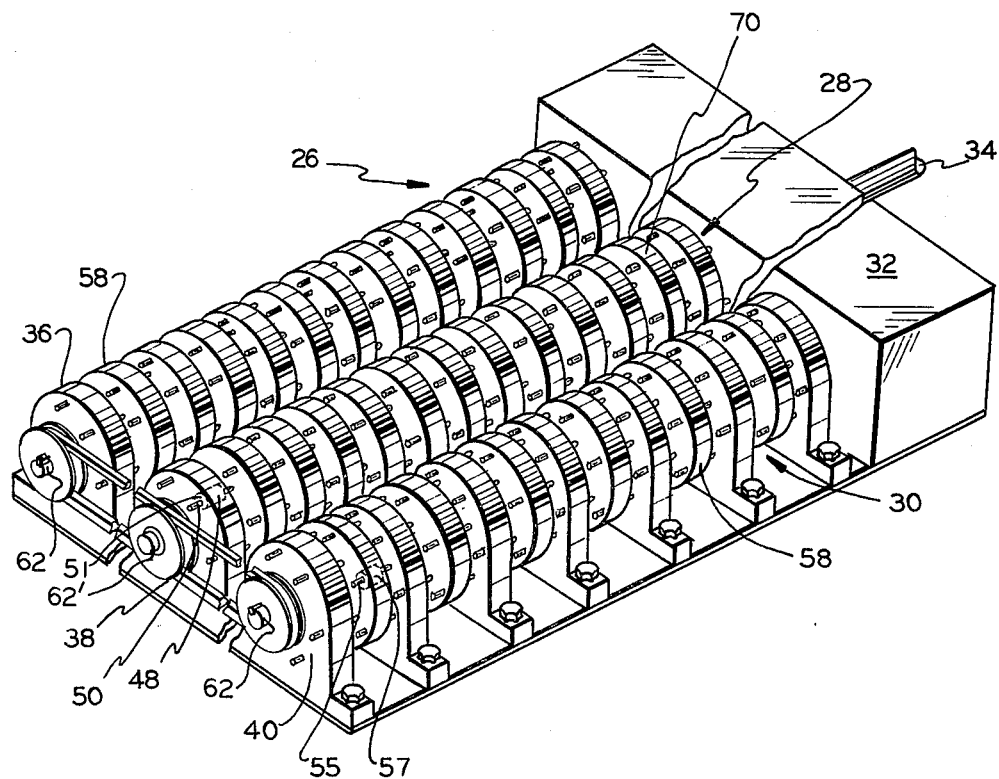
FIG. 1 is a fragmentary persepective view of a motor constructed in accordance with the present disclosure.

FIG. 1 shows the motor consisting of three distinct rotary units 26, 28 and 30 spaced apart from each other, while each is coupled to a gearbox 32 from which an output shaft 34 is provided. It is within contemplation that a large, preferably an odd, number of units be used. In general, the rotary units 26, 28 and 30 are similar, each including interleaved rotors and stators, both of which carry radially disposed electromagnets which provide magnetic drive forces. The sets of individual electromagnets which move in each of the rotary units are aligned parallel to the central axis; however, in each rotary unit, they are offset from those in another rotary unit, so as to provide a substantially continuous drive torque. In such an arrangement, the electromagnets are incorporated in continuous magnetic circuits in which both ends of the internal electromagnets serve to accomplish driving torque. The separation between the rotary units is sufficient to avoid any significant interference between the magnetic fields of each unit.

Ideally, each rotary unit includes six rotors and either six or seven stators. The similar rotary units 26, 28 and 30 each include a plurality of separate rotors and stators aligned along the axis of rotation. The sets of transversely aligned stators 36, 38 and 40 in the three rotary units are generally similar and may be constructed as disclosed in the aforesaid U.S. Pat. No. 3,568,030. That is, six electromagnets 48 are radially spaced about each of the stators, and provide pole pieces 50 extending in axial alignment. The stator and rotor electromagnets are similar, each including a coil or winding disposed on a pole piece, all more or less as disclosed in the patent.

All of the rotors 58 in the unit are also similar and also may be formed of nonmagnetic material, such as resin-impregnated fiber glass, affording strength and light weight. The rotor electromagnets 57 are fixed in a circular array in each rotor 58 and each comprises a pole piece 55 carrying a winding as set forth in the patent. The rotors 58 in each of the rotary units 26 and 30 are in keyed alignment on central shafts 62 as taught in my earlier patent. Each of the shafts 62 is journaled through its associated stators and is terminated in the gearbox 32 which includes gear means for locking the shafts 62 in fixed relationship, and provides drive power to an output shaft 34. The rotors 58 of intermediate rotary unit 28 are not so keyed and are free wheeling on shaft 62.

Figure 2:
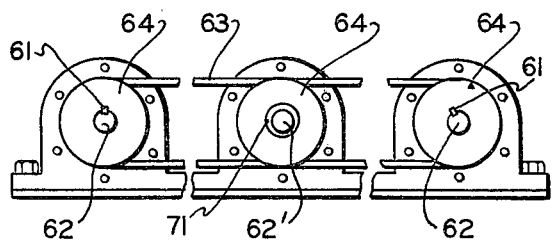
FIG. 2 is a view in elevation showing the coupling arrangement of adjacent shafts.

As described, the individual rotary units 26, 28 and 30 are similar in nature; however, it is important to understand that the relationship between the rotor electromagnets 57 (contained in the rotors 58) of each rotary unit are offset as a gang with respect to each other rotary unit. That is, the rotors 58 in each of the rotary units 26 and 30 are keyed to their individual shaft 62 (key 61, FIG. 2) with their electromagnets 57 in axial alignment. However, the electromagnets 57 in each rotary unit, are offset, as by 20°, from those of the other rotary units, to accomplish a staggered relationship between the rotary units 26, 28 and 30 which provides more uniform torque from the motor. The shafts 62 are shown coupled to shaft 62' with a belt 63 operating on pulleys 64.

Operation of the motor is generally as described in my U.S. Pat. No. 3,568,030. That is, the rotor electromagnets 57 are energized by an intermittent unidirectional current as from a battery, so that their pole pieces 55 are repeatedly similarly polarized. However, the stator windings 51 receive an alternating (bidirectional) current to accomplish alternate attracting and repelling relationships with the rotor electromagnets.

The stator electromagnets 48 must be either repelling, attracting or neutral with respect to the rotor electromagnets 57. That is, as the rotor electromagnets 57 receive unidirectional current they establish a selected polarity. The stator pole pieces 50 must be energized alternately with reversing polarity and neutralized. Specifically, assuming the stators 40 in the rotary unit 30 are in a dead center position in which both the stator and rotor pole pieces are neutral, in rotary unit 28, the rotor pole pieces 55 have passed the stator pole pieces 50 with the result that repelling forces are desirable between the pole. To provide such forces, the stator electromagnets 48 in the stators 38 are driven with electrical current to establish the desired polarity. As a result, repulsion forces are provided between the stator pole pieces 50 in the stator 38 and rotor pole pieces 55.

Switching poles will be accomplished generally as described in my U.S. Pat. No. 3,568,030, but it is now regarded as desirable to utilize electronic switching to gain speed. Any of the rapid fire electronic switching circuits known to the art may be substituted for the mechanical track disclosed in my earlier patent.

The individual rotors 70 of the intermediate unit 28 are free wheeling on the shaft 62'. Thus, they are free to interact with adjacent stators and to transmit rotational forces to structure carried by the adjacent shafts 62, but without driving the shaft 62'. The shaft 62' is free to rotate within journal bearings of both the stators and rotors, the rotors being held in place by means of slip rings 71, which pass current to the magnetic circuits in conventional fashion. Rotation of the shaft 62' may be synchronized with that of the shafts 62 through the gear box 32, but it is preferred to accomplish such synchronization with a V-belt or similar arrangement.

The direction of rotation of the rotors 70 journaled on the intermediate shaft 62' is opposite that of the shaft 62'. These rotors interact magnetically with adjacent rotors but it is desirable that they also be mechanically linked to ensure that the speeds of rotation of adjacent rotors 70 are synchronized in the same fashion as they are in my previous U.S. Pat. No. 3,568,030.

Reference herein to details of the illustrated embodiment should not be taken as a limitation to the scope of the claims which themselves recite those details regarded as essential to the invention.

I claim:

1. An electric motor for providing rotary drive power from a source of electrical power, comprising:
   a plurality of rotatably mounted shafts;
   gearing means for interconnecting said shafts together to drive an output shaft;
   a plurality of rotors supported on each of said shafts, each of said rotors including a multiplicity of magnetic means polarly disposed parallel to the axes of rotation of said shafts;
   a plurality of stators each fixed in stationary relationship in combination with one of said rotors, each of said stators including a multiplicity of electromagnets having pole pieces therein, said electromagnets affixed in said stators to dispose said pole pieces in parallel relationship to the magnetic means of a related rotor, said pole pieces and said magnetic means of each of said stator and rotor combinations being offset in relationship to the pole pieces and magnetic means of each other stator and rotor combination to provide a staggered drive relationship between the stator and rotor combinations;
   a plurality of switching means, one being coupled to each of said shafts for supplying electrical current to said electromagnets in phase synchronization with the position of the rotors of each of said stator and rotor combinations whereby to propel said shafts;
   means for keying the rotors supported by alternate shafts to said shafts so that said alternate shafts are driven by said rotors, the remaining rotors being free wheeling on their respective shafts; and
   means for mechanically coupling adjacent shafts so that the said driven shafts drive adjacent shafts in the same direction.

2. An electric motor according to claim 1 wherein six rotors are supported by each shaft.

3. An electric motor according to claim 1 wherein said switching means are electronic switching means.

4. An electric motor according to claim 1 wherein six rotors are supported by each shaft, and each shaft is journaled through six stators such that the stators and rotors are interleaved, and wherein the distal ends of the shafts are connected by a continuous belt.

5. An electric motor according to claim 1 wherein the free wheeling rotors are held on their shafts by slip rings arranged to transfer electric current to the magnetic means carried by said rotors.

* * * * *